United States Patent

Wahl et al.

[11] Patent Number: 5,499,839
[45] Date of Patent: Mar. 19, 1996

[54] WHEEL SUSPENSION SYSTEM WITH ELASTOKINEMATIC WHEEL ADJUSTMENT

[75] Inventors: George Wahl, Pforzheim; Matthias Dietz, Bietigheim-Bissingen; Norbert Schote, Ammerbuch; Robert Klosterhuber, Stuttgart; Karl Sommerer, Wiernsheim; Reinhard Kunert, Weissach; Fritz Gerber, Walheim, all of Germany

[73] Assignee: Dr. Ing. h.c.F. Porsche AG, Weissach, Germany

[21] Appl. No.: 350,041

[22] Filed: Nov. 29, 1994

[30] Foreign Application Priority Data

Nov. 29, 1993 [DE] Germany .......................... 43 40 554.1
Jul. 1, 1994 [DE] Germany .......................... 44 23 126.1

[51] Int. Cl.$^6$ ...................................................... B60G 3/18
[52] U.S. Cl. ........................................... 280/701; 280/690
[58] Field of Search ................................ 280/701, 690, 280/696, 697, 692, 726, 725, 724, 675, 673, 668, 666

[56] References Cited

U.S. PATENT DOCUMENTS

| | | | |
|---|---|---|---|
| 4,245,853 | 1/1981 | Inoue et al. | 280/701 |
| 4,511,160 | 4/1985 | Inoue | 280/701 |
| 4,671,532 | 6/1987 | Matschinsky et al. | 280/701 |
| 4,714,132 | 12/1987 | Hattori et al. | 280/690 |
| 4,815,755 | 3/1989 | Takata et al. | 280/701 |
| 4,998,748 | 3/1991 | Kashiwagi et al. | 280/701 |

FOREIGN PATENT DOCUMENTS

| | | | |
|---|---|---|---|
| 0234694A1 | 9/1987 | European Pat. Off. . | |
| 0271879A2 | 6/1988 | European Pat. Off. . | |
| 2645800 | 10/1990 | France . | |
| 2818198A1 | 10/1979 | Germany . | |
| 2818198 | 10/1979 | Germany | 280/690 |
| 2822058 | 11/1979 | Germany | 280/690 |
| 3200855A1 | 7/1983 | Germany . | |
| 3616005C2 | 11/1986 | Germany . | |
| 4108164A1 | 9/1992 | Germany . | |
| 4108164C2 | 9/1992 | Germany . | |
| 4340557 | 11/1993 | Germany . | |
| 61-21803 | 1/1986 | Japan . | |
| 61-21802 | 1/1986 | Japan . | |

OTHER PUBLICATIONS

"Die Radführungen der Strassenfahrzeuge: Analyse, Synthese, Elasto-Kinematik" by Wolfgang Matschinsky, 1987, from publication *Fahrzeugtechnische Schriftenreihe*.

*Primary Examiner*—Margaret A. Focarino
*Assistant Examiner*—Peter C. English
*Attorney, Agent, or Firm*—Evenson, McKeown, Edwards & Lenahan

[57] ABSTRACT

A wheel suspension for an axle of a motor vehicle has a transverse control arm and tension strut, the transverse control arm being held on the wheel carrier by way of a joint, and the body-side bearings of the transverse control arm and of the tension strut as well as of the connection bearing between the transverse control arm and the tension strut being constructed with a defined characteristic for the elastokinematic adjustment of the wheel under the effect of lateral and peripheral forces acting upon the wheel. The transverse control arm with the connected tension strut is arranged below a wheel drive shaft and—with respect to the driving direction—in front of a tie rod. In the top view, the tension strut extends diagonally toward the front, the transverse control arm and the tie rod having a positive position with respect to one another. They form a wheel steering pole situated outside the track width and behind the wheel center transverse plane. In front of the wheel center transverse plane and outside the wheel center longitudinal plane, a point of intersection is formed through an axis extending through the wheel-carrier-side joint of the transverse control arm and the body-side bearing of a McPherson spring strut or, alternatively, of an upper side double arm and spring strut assembly.

14 Claims, 13 Drawing Sheets

WHEEL SUSPENSION SYSTEM WITH ELASTOKINEMATIC WHEEL ADJUSTMENT

BACKGROUND AND SUMMARY OF THE INVENTION

This invention relates to improved wheel suspension systems for motor vehicles.

A wheel suspension is known from German Patent Document DE 36 16 005 C2 in which a lower transverse control arm is swivellably connected by means of its one end to the vehicle frame and is swivellably connected by means of its other end to a steering knuckle. A strut, which extends approximately in the longitudinal direction, is connected with the transverse control arm, the free end of this strut being elastically supported on the vehicle body.

Furthermore, a wheel suspension is known from German Patent Document DE 32 00 855 A1 in which a strut is connected in an articulated manner with a transverse control arm.

Also, from German Patent Document DE-41 08 164 C2, a wheel suspension is known in which the upper link plane comprises two separated control arms.

It is an object of the invention to provide a wheel suspension for an axle of a motor vehicle which, when peripheral and lateral forces act upon the wheel, ensures a targeted elastokinematic wheel position change which assures stable vehicle handling during cornering and straight-ahead driving.

These objects are achieved according to preferred embodiments of the invention by providing a wheel suspension system comprising:

a wheel carrier for carrying a wheel rotatable about a wheel spin axis and drivingly connected to a wheel drive shaft, a steering gear tie rod connected to the wheel carrier, a transverse control arm connected to the wheel carrier by a first joint connection and to a vehicle frame by a second joint connection, a tension strut connected pivotably to the transverse control arm by a third joint connection and to a vehicle frame by a fourth joint connection, and an upper wheel carrier support assembly connected to the wheel carrier and to a vehicle frame, said first joint connection and a pole of the connection of the upper wheel carrier support assembly to the vehicle frame defining a control axis, wherein the transverse control arm with the connected tension strut is arranged below the wheel drive shaft and in front of the tie rod with respect to the driving direction of the vehicle, wherein the tension strut extends forwardly, diagonally inwardly toward a vehicle center line, wherein the transverse control arm and the tie rod have a positive adjustment with respect to one another resulting in a wheel steering pole which is situated outside a vehicle wheel track width and behind a wheel center transverse plane, and wherein the control axis intersects a wheel road surface contact plane at a position in front of the wheel center transverse plane.

The invention is based on two constructions, in which case one construction has a McPherson rear axle and the other construction has two separated control arms instead of the McPherson spring strut. The lower plane of the wheel suspension comprising the transverse control arm, the tension strut and the tie rod has essentially the same design in both constructions.

As a result of the upper plane of the wheel suspension which consists of separated control arms, the so-called imaginary control axis, which forms a point of intersection in the wheel contact plane, for achieving forces acting upon the wheel in the case of braking forces, lateral forces and impact forces, may be designed or adapted in an advantageous manner corresponding to the requirements with respect to the vehicle handling.

The principal advantages achieved by means of the invention are that, as a result of the geometric position of the transverse control arm forming the rear wheel suspension with the connected tension strut and the tie rod, when forces, such as driving, braking and lateral forces act upon the wheel, as well as during load changing operations, a stable vehicle handling is achieved by an elastokinematic adjustment of the wheels. Particularly during cornering, an improvement of the vehicle handling is achieved when a cornering is initiated and when curves change by means of the fact that the wheel on the outside of the curve moves to the toe-in position. In addition, the directional control during braking in a curve as well as during straight-ahead driving is improved as a result of the fact that the rear wheels move into the toe-in position. During an acceleration in a curve, an understeering action of the motor vehicle is usually reinforced. This understeering tendency is reduced by the fact that the rear wheels move into the toe-out position. Furthermore, as a result of this function, when the accelerator is released (load change), the wheel is adjusted in the toe-in direction and, during a load change in a curve, a turning-in is therefore counteracted.

The geometric position of the wheel suspension elements, such as the spring strut, the transverse control arm, the tie rod and the tension strut is particularly selected such that, during the corresponding driving conditions, a targeted moving into the toe-in position or into the toe-out position of the wheel is in each case achieved in an elastokinematic manner.

Thus, when lateral forces act upon the wheel, a toe-in adjustment takes place, particularly of the wheel which is on the outside of the curve. This is achieved by a corresponding design of the caster offset. An axis, which extends through the upper support bearing of the McPherson strut and the pivotal connecting point of the transverse control arm on the wheel carrier, forms a point of intersection in the wheel contact plane—with respect to the driving direction—in front of the direction of the effect of the lateral force. A lever arm is created between the point of intersection and the lateral force. As a result of a moment formed by this lever arm and the lateral force, the tie rod receives a slight pressure force which is lower than the pressure force upon the transverse control arm. Since the tie rod is disposed on the vehicle body in a harder manner than the transverse control arm, it can yield less toward the interior than the transverse control arm which is disposed on the vehicle body in a softer manner.

The transverse control arm and the tie rod have a positive position with respect to one another and form a wheel steering pole which is situated outside the track width and behind the wheel center transverse plane—viewed with respect to the driving direction.

In the case of lateral forces, a moment formed by the lateral force and a lever arm from the wheel steering pole to the direction of the effect of the lateral force is superimposed on the moment resulting from the caster offset.

When the characteristics of the bearings of the tie rod and of the transverse control arm have approximately the same hardness and the bearing of the tension strut on the vehicle body yields in the axial direction, a toe-in of the wheel can occur as a result of the moment formed by the lateral force and the lever arm to the wheel steering pole. In this case, the transverse strut and the tie rod are swivelled toward the rear—with respect to the driving direction—about the body-side bearings, the tension strut also being pulled toward the rear.

In the case of a McPherson rear axle, during the braking of the vehicle, moments are exercised on the wheel which complement one another, on the one hand, by the forming of the wheel steering pole and, on the other hand, by the steering offset, which moments both cause an adjustment of the wheels in the toe-in direction.

For this purpose, the transverse control arm and the tie rod are held in correspondingly coordinated bearings on the vehicle body and the tension strut can shift toward the rear—with respect to the driving direction—by way of the body-side bearing. In this case, the transverse control arm is stressed with respect to pressure and the tie rod is stressed with respect to tension, at the same time, swivelling rearward about their body-side bearings. For limiting the toe-in, the body-side bearing of the tension strut is designed by means of a characteristic limiting the tension movement so that the toe-in can be adjusted corresponding to the requirements.

In the case of the construction of the rear axle with an upper link plane consisting of two separated control arms, a control axis is formed which meets the wheel contact plane within the track width and therefore also within the effective direction of the braking. As a result, in the case of braking forces, the wheel is adjusted in the toe-out direction; however, as a result of the simultaneously acting longitudinal springing, the resulting adjustment of the wheel predominates in the toe-in direction about the wheel steering pole so that, in the final effect, a targeted toe-in adjustment can be achieved.

When driving forces act upon the wheel in the case of the McPherson rear axle, the moment about the wheel steering pole is superimposed on the moment which acts at the level of the wheel spin axis and results from the driving force x the lever arm to the axis so that a wheel position change in the toe-in direction by the latter moment is contrasted by a toe-out adjustment by the other moment. In the case of this toe-out adjustment, the tie rod is pulled and the transverse control arm is pressed, whereas, in the case of the toe-in adjustment, the tension strut is pressed and, as a result, is shifted toward the front in the driving direction in its body-side bearing, in which case the transverse control arm and the tie rod also swivel forward about their body-side bearings.

In the case of a construction of a rear axle system with two separated control arms instead of a McPherson strut system, a control axis is formed by the upper link plane which is situated at the level of the wheel spin axis outside a perpendicular wheel center longitudinal plane, and the wheel is adjusted in the toe-out direction by way of the driving force acting at the level of the wheel center or of the wheel drive shaft. This toe-in change is reinforced by the simultaneously occurring longitudinal springing.

Other objects, advantages and novel features of the present invention will become apparent from the following detailed description of the invention when considered in conjunction with the accompanying drawings.

BRIEF DESCRIPTION OF THE DRAWINGS

FIG. 2 is a partial frontal schematic view depicting lower parts of the rear wheel suspensions of FIGS. 1 and 1a;

FIG. 5a is a diagrammatic representation of the geometric position of a caster offset at the rear wheel of the embodiment according to FIG. 1a;

FIG. 8a is a diagrammatic representation of the rear wheel suspension with the steering offset according to FIG. 1a;

FIG. 11a is a diagrammatic representation of the rear wheel suspension with the disturbing-force lever arm according to FIG. 1a;

DETAILED DESCRIPTION OF THE DRAWINGS

Figure 1:
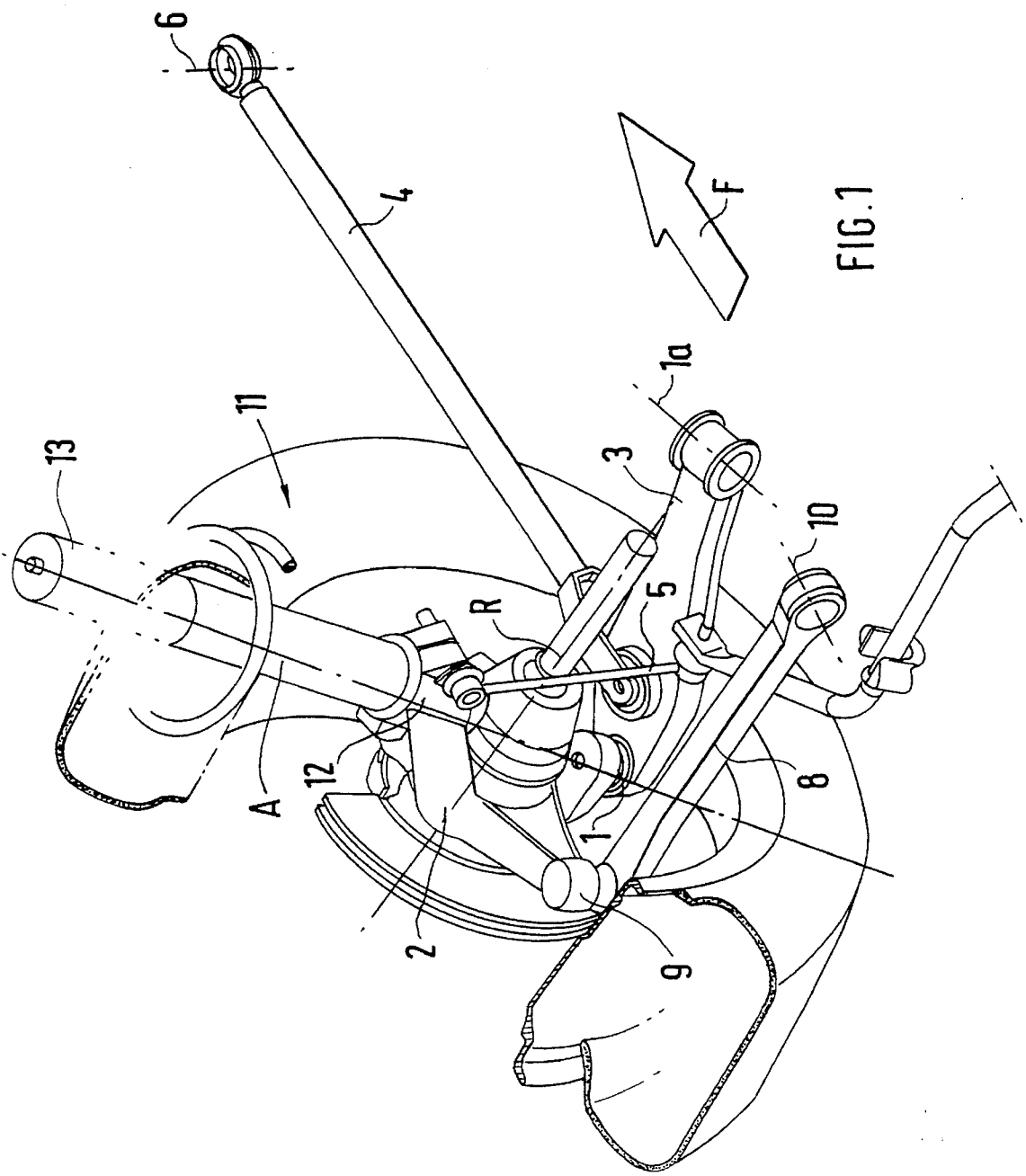
FIG. 1 is a diagrammatic representation of a McPherson rear wheel suspension, constructed according to a first preferred embodiment of the present invention.

The wheel suspension for a rear axle of a motor vehicle comprises a transverse control arm 3 held by way of a joint 1 on the wheel carrier 2 and by way of a bearing 1a on the vehicle body. A tension strut 4 is connected with this transverse control arm 3 by way of an elastic bearing 5 and is supported on the vehicle body in another bearing 6 which is elastic in the strut direction. The transverse control arm 3 with the connected tension strut 4 is arranged below a wheel drive shaft R. Behind the transverse control arm 3—with respect to the driving direction F—a tie rod 8 is pivotally connected, on the one hand, on the wheel carrier 2 in bearing 9, and on the other hand, on the body in bearing 10. The elastic bearing 6 may also be a joint, in which case the bearing 5 will then be constructed with a soft radial characteristic in the axial direction.

According to a first embodiment according to FIGS. 1 to 13, a spring strut 11 is held in a receiving device 12 of the wheel carrier 2 and is supported by means of a bearing 13 on the vehicle body. A control axis A is formed between the bearing 13 and the bearing 1 of the transverse control arm 3 on the wheel carrier 2. This control axis A has a point of intersection X in the wheel contact plane—viewed as a top view and with respect to the driving direction F—in front of a wheel center transverse plane z—z and outside a wheel center longitudinal plane y—y or of the track width S. At the level of the wheel spin axis R, the control axis A is spaced a distance from the perpendicular wheel center longitudinal plane y—y.

In the lateral view, the tension strut 4 extends at an angle α with respect to a horizontal plane diagonally toward the front and inward toward the longitudinal center axis of the vehicle. The body-side bearing 6 of the tension strut 4 is situated above the wheel spin axis R but, depending on the design of the axle with respect to its antidive and antisquat action, may also be arranged below this axis.

The transverse control arm 3 and the tie rod 8 are set in a positive manner with respect to one another and, together with the extensions of their course direction, form a wheel steering pole P arranged on the exterior side of the wheel. With respect to the driving direction F, this wheel steering pole P is situated behind the perpendicular wheel center transverse plane z—z and outside the wheel center longitudinal plane y—y or the track width S.

According to another embodiment according to FIGS. 1a, 5a, 6a, 8a, 9a, 11a and 12a, the rear wheel suspension has, instead of a spring strut according to FIG. 1, two separated control arms 23 and 24 in an upper link plane, which control arms 23 and 24 are pivotally connected on the wheel carrier in positions 21 and 22 at a distance "d" with respect to one another. A spring strut 25 extends through between these two positively set control arms 23 and 24, which spring strut 25 is supported on the wheel carrier approximately in the plane of the tension strut 4 and of the transverse control arm 3. By means of the upper link plane (control arms 23, 24), the position of the control axis A is significantly influenced which, according to the embodiment according to FIG. 1a, has a point of intersection X in the wheel contact plane within the longitudinal center plane Y—Y or the track width S. At the same time, this control axis A extends at the level of the wheel center spin axis R at a distance RST which is formed on the exterior side of the wheel with respect to the perpendicular wheel center longitudinal plan Y—Y. The lower link plane consisting of the tension strut 4, the transverse control arm 3 and the tie rod 8 remains essentially unchanged from the arrangement of FIG. 1.

Figure 1A:
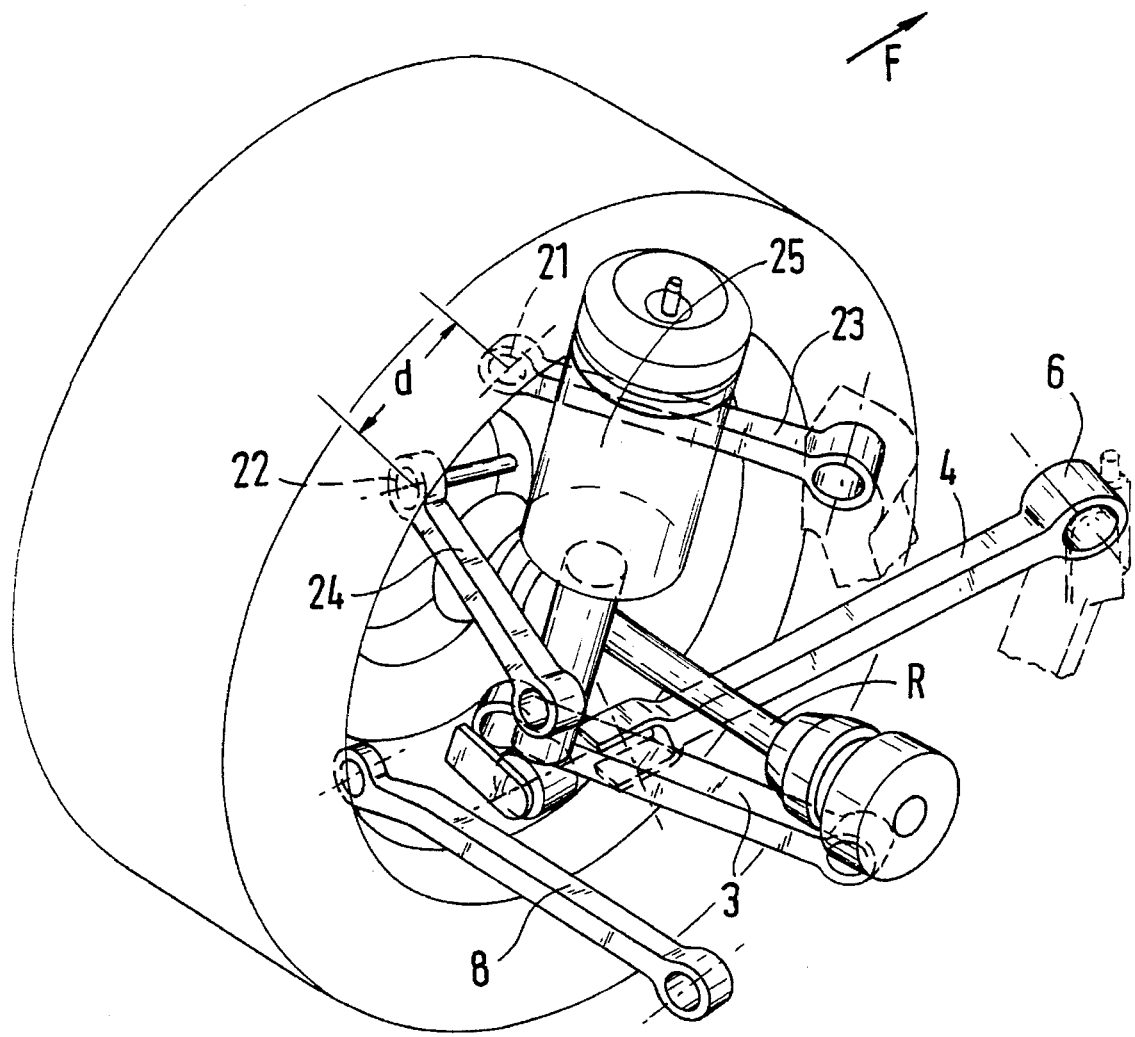
FIG. 1a is a diagrammatic representation of a rear wheel suspension comprising an upper link plane consisting of separated control arms, constructed according to a second preferred embodiment of the present invention.
Figure 2:
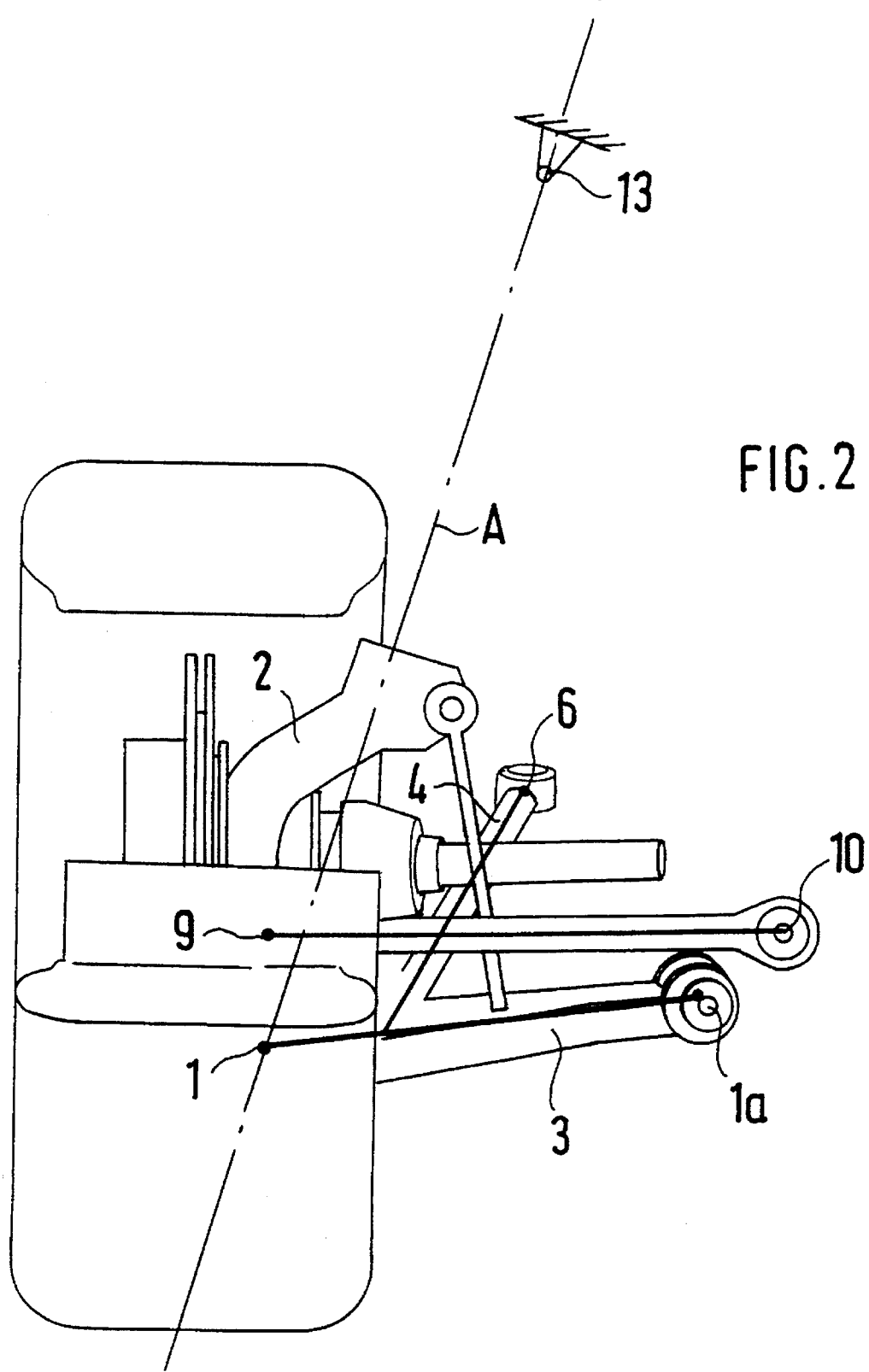
Figure 3:
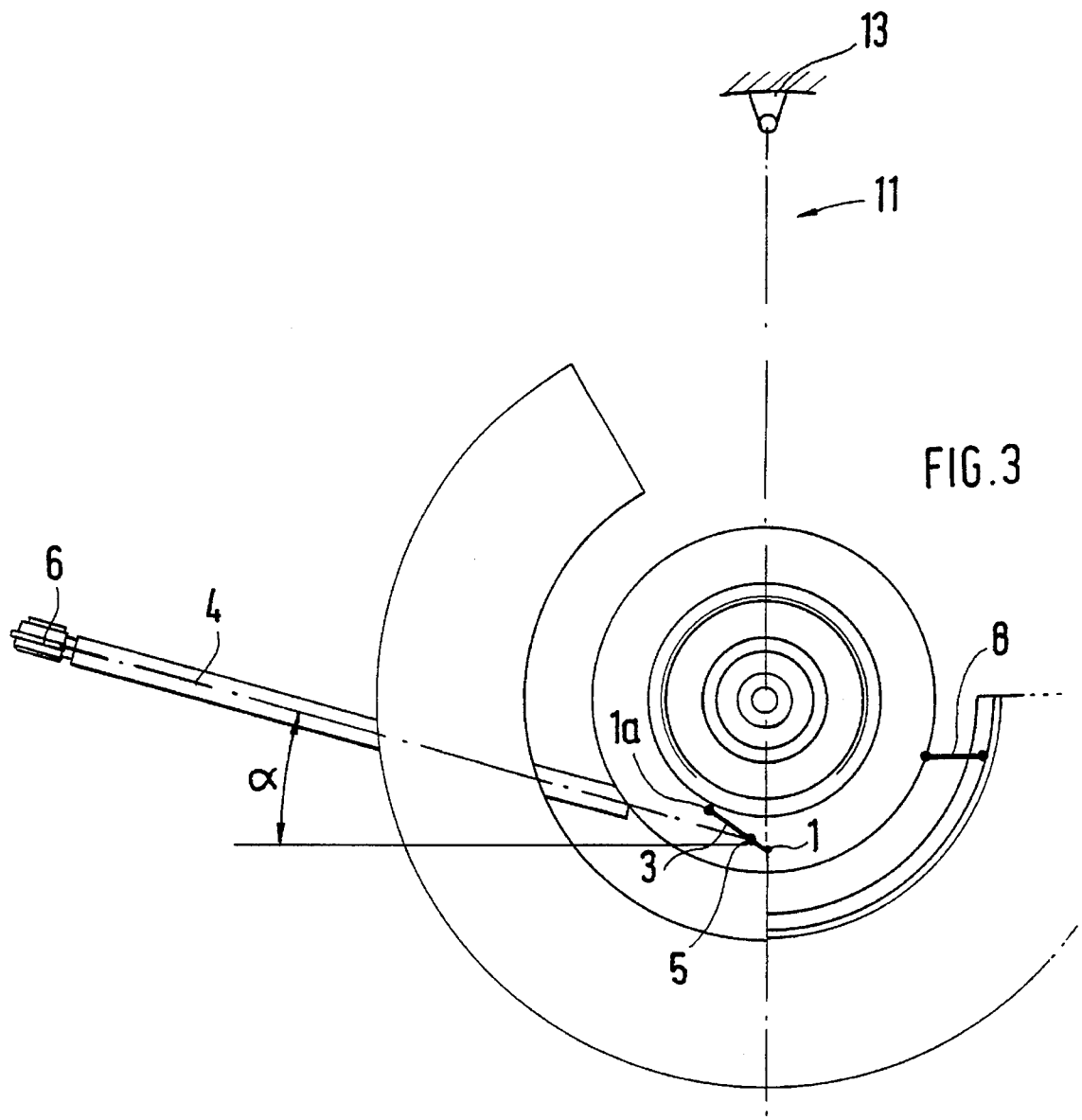
FIG. 3 is a lateral schematic view of the wheel suspension according to FIG. 2.
Figure 4:
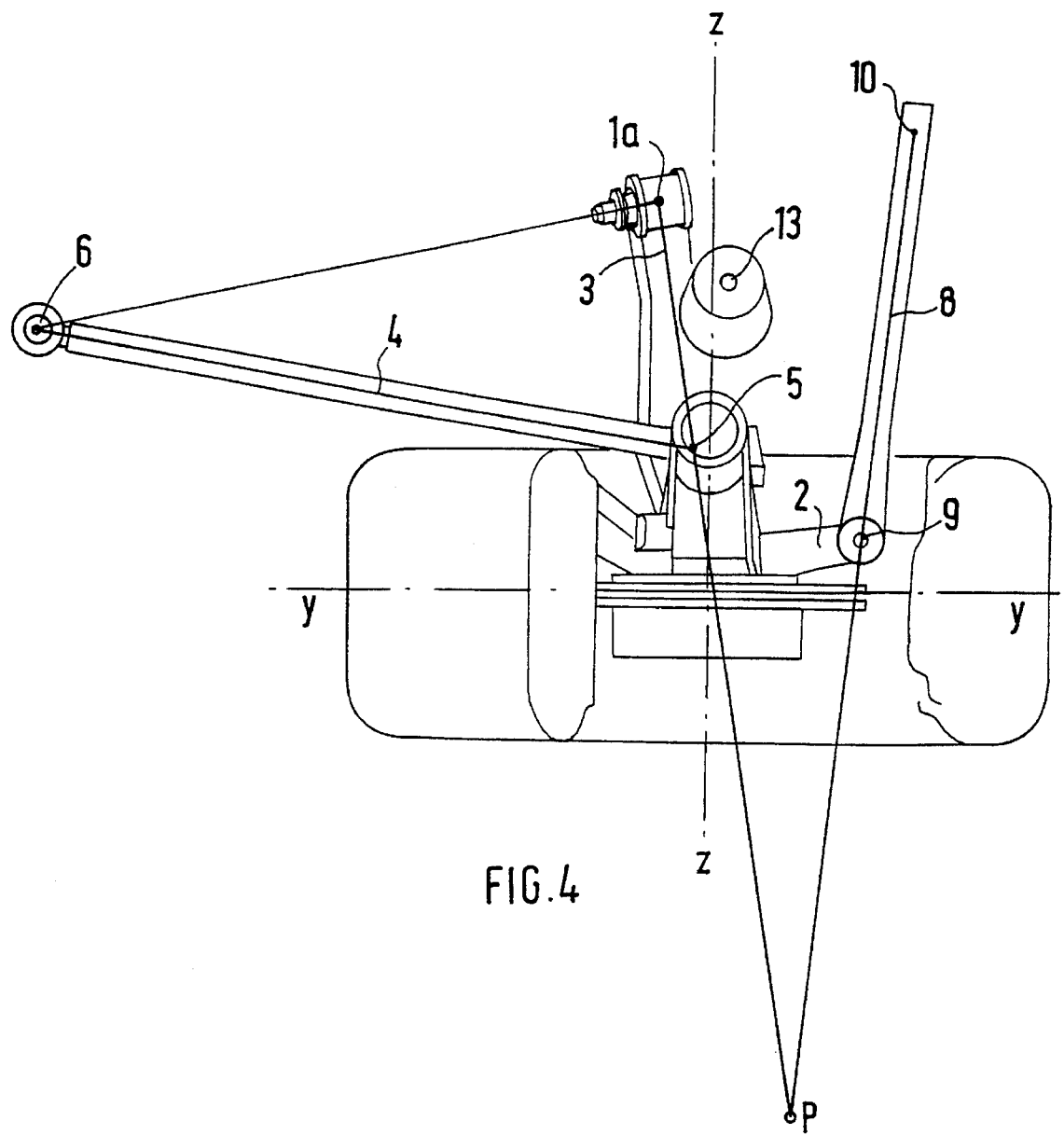
FIG. 4 is a schematic top view of the wheel suspension configuration according to FIGS. 2 and 3.
Figure 5:
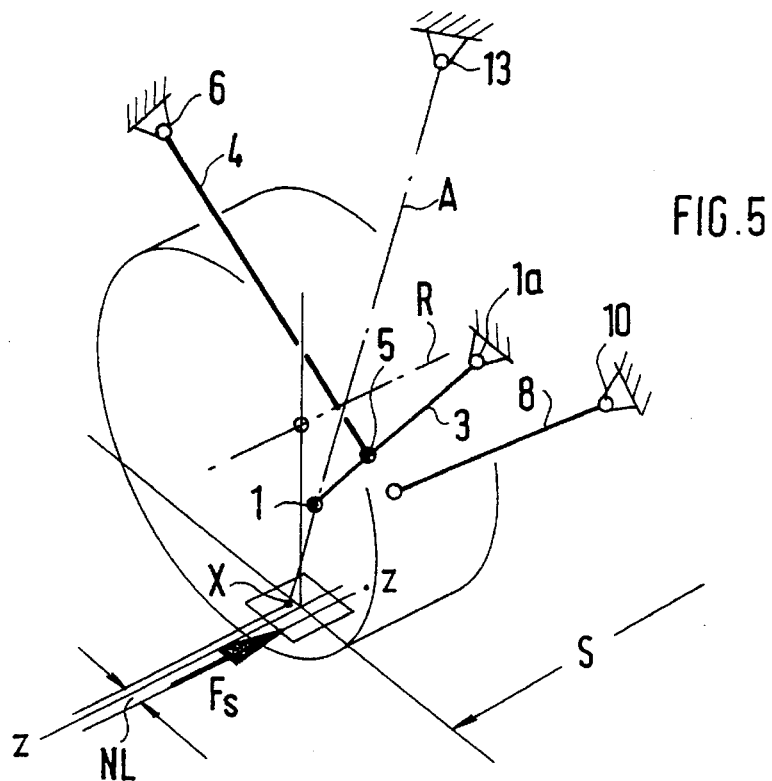
FIG. 5 is a diagrammatic representation of the geometric position of a caster offset at the rear wheel of the embodiment according to FIG. 1.
Figure 6:
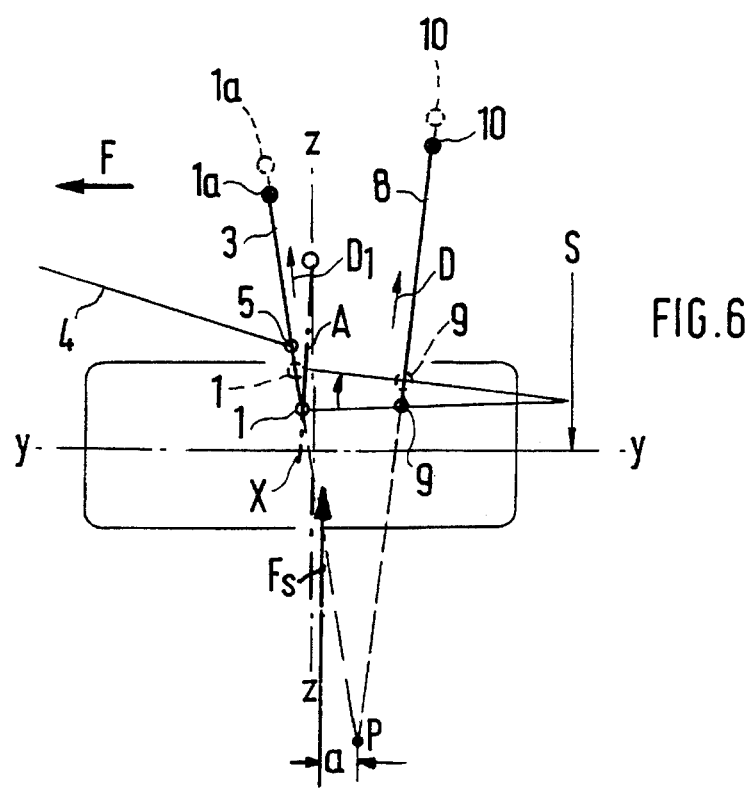
FIG. 6 is a top view of FIG. 5 with a representation of the displacements of the transverse control arm and the tie rod in the case of a lateral force.
Figure 5A:
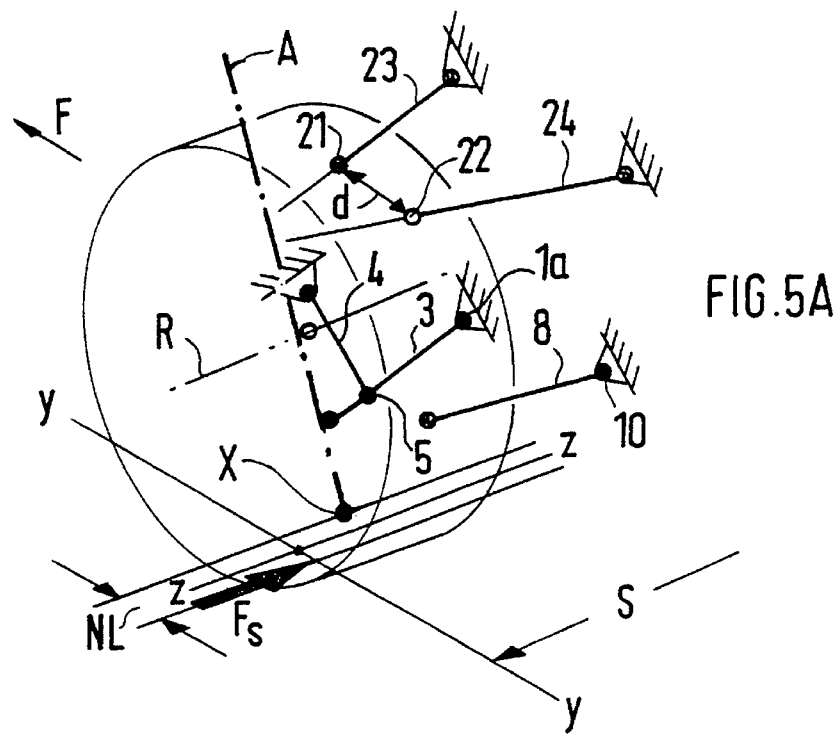
Figure 6A:
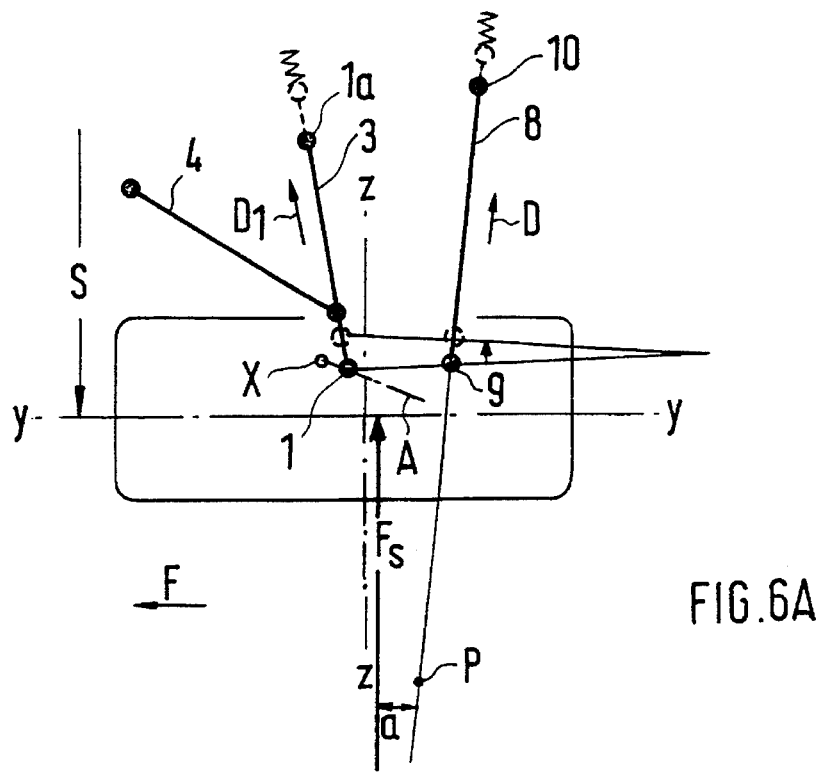
FIG. 6a is a top view of FIG. 5a with a representation of the displacements of the transverse control arm and the tie rod in the case of a lateral force.
Figure 7:
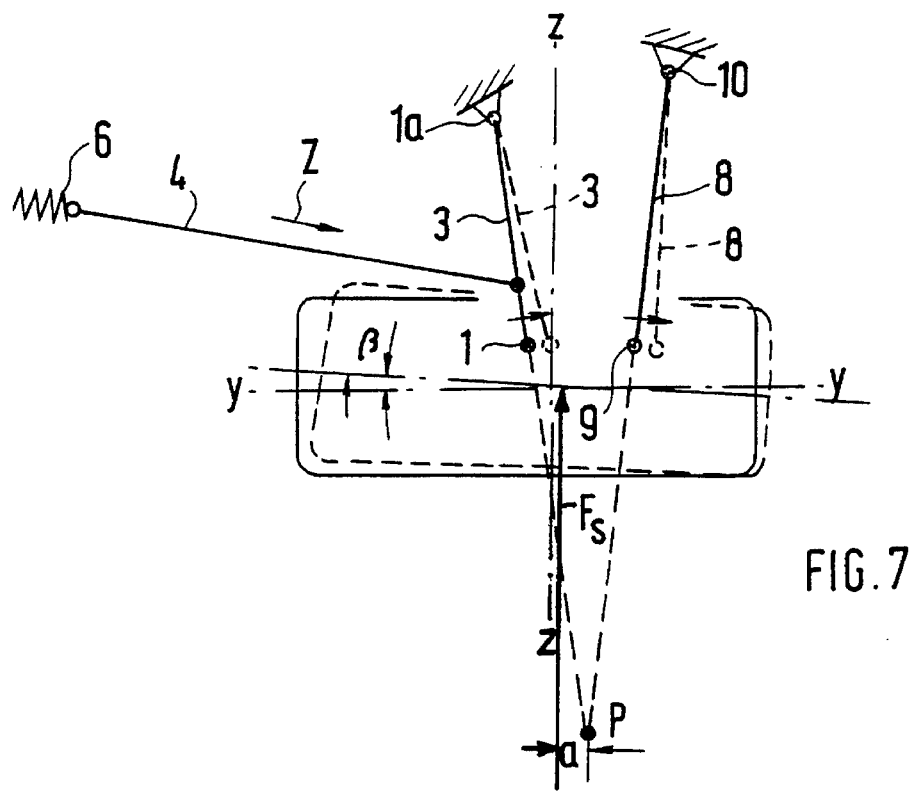
FIG. 7 is a representation according to FIG. 6 showing the wheel steering pole and the application of the lateral force.

As illustrated in detail in FIGS. 5 to 7 of the embodiment according to FIG. 1 and FIGS. 5a and 6a of the embodiment according to FIG. 1a, under the effect of lateral forces $F_s$, the wheel is adjusted in the toe-in direction. This wheel adjustment is achieved in that, as a result of the moment formed of the lateral force $F_s$ x NL (NL being the caster offset), the tie rod 8 is subjected to a lower pressure force D than the transverse control arm. The body-side bearing 10 of the tie rod 8 yields less toward the interior than the bearing 1a of the transverse control arm 3 which must support a higher pressure force $D_1$. A moment, which is formed of the lateral force $F_s$ x the distance a, is superimposed on this moment $F_s$ x NL, in which case the distance a is created between the direction of the effect of the lateral force $F_B$ and the wheel steering pole P. As illustrated in detail in FIG. 7, the transverse control arm 3 and the tie rod 8 swivel under the effect of this moment $F_s$ x a against the driving direction F, in which case, for a better representation, it is assumed that the tie rod 8 and the transverse control arm 3 are rigidly disposed on the body. The toe-in angle is marked by a β. For adjusting the transverse control arm 3 and the tie rod 8, it is required that the tension strut 4 has a bearing 6 which is relatively soft in the tension direction Z. As soon as this softly disposed tension strut 4 yields in the bearing 6, the wheel will rotate about the wheel steering pole P in the toe-in direction.

Figure 8:
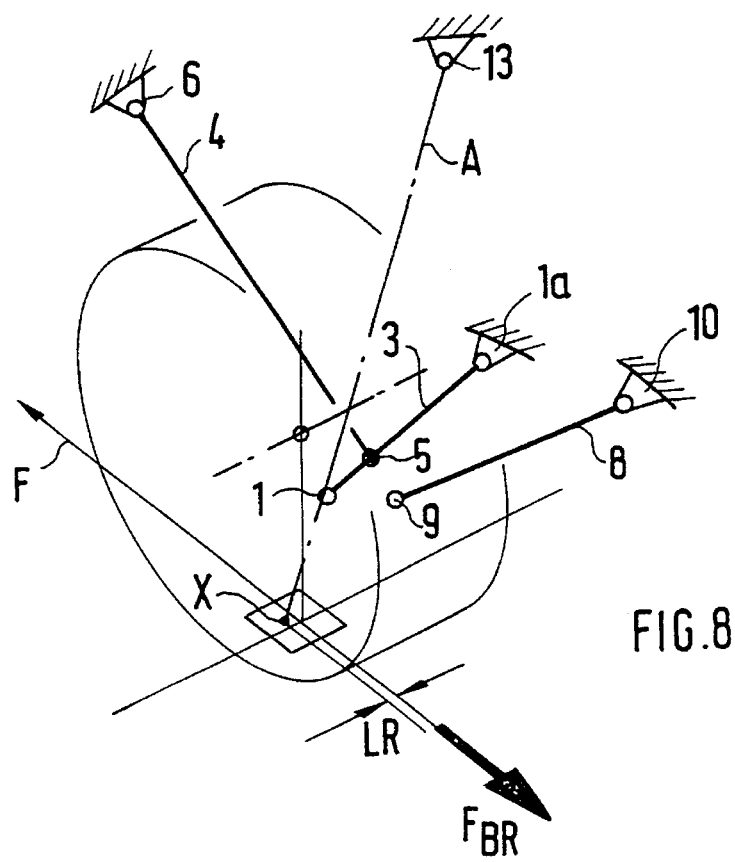
FIG. 8 is a diagrammatic representation of the rear wheel suspension showing the steering offset according to FIG. 1.
Figure 9A:
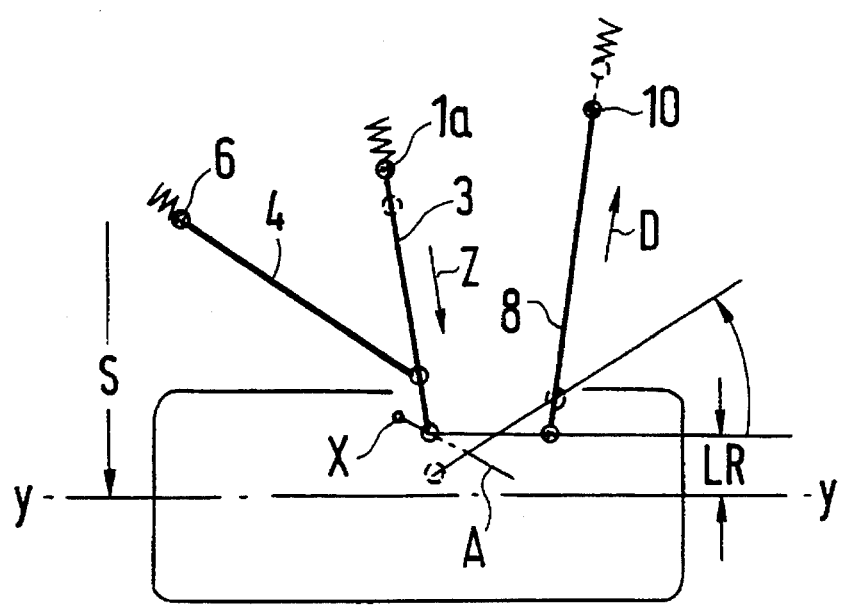
FIG. 9a is a top schematic view of FIG. 8a with the representation of the displacements of the transverse control arm and the tie rod under the effect of the moment consisting of the braking force x the steering offset.
Figure 9:
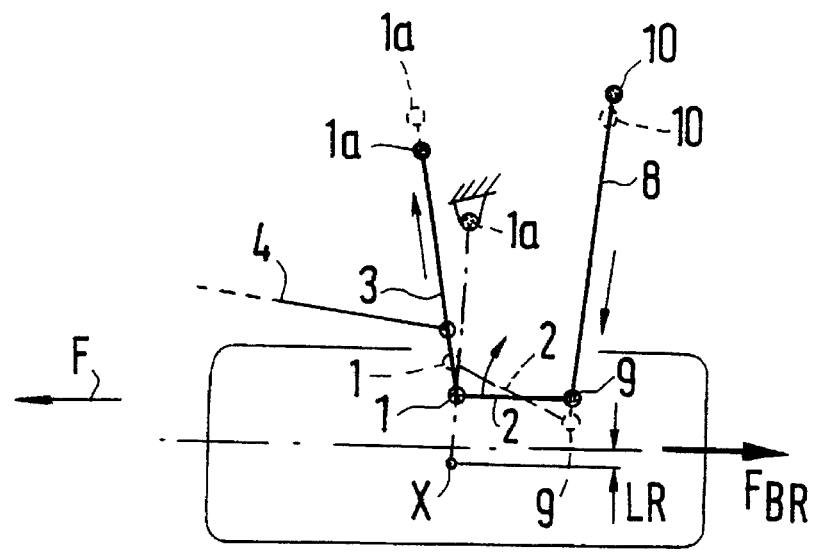
FIG. 9 is a top schematic view of FIG. 8 showing the representation of the displacements of the transverse control arm and the tie rod under the effect of the moment consisting of the braking force x the steering offset.
Figure 10:
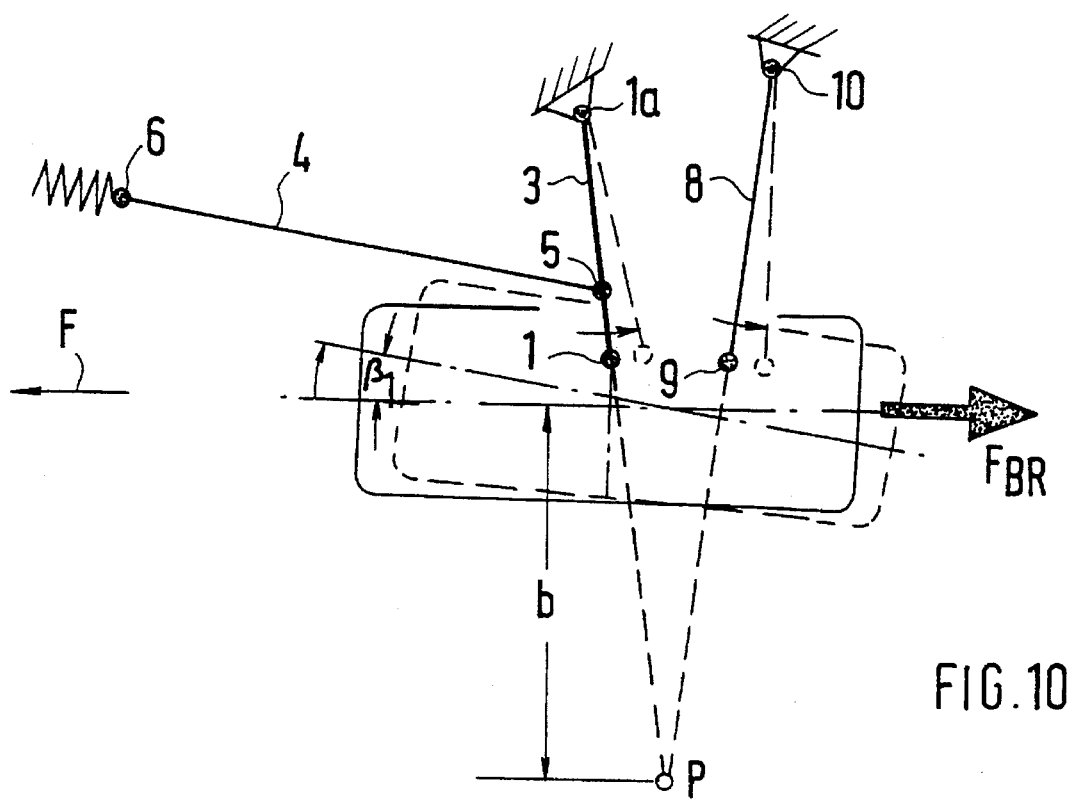
FIG. 10 is a representation according to FIG. 9 showing the wheel steering pole and the effect of the moment consisting of braking force x distance to the wheel steering pole.

As illustrated in detail in FIGS. 8 to 10 of the embodiment according to FIG. 1, the wheel is adjusted under the effect of braking forces FBR in the toe-in direction about the angle $\beta_1$. Because of the moment $F_{BR}$ x LR—LR being the steering offset—, the tie rod 8 is pulled or stressed with respect to tension and the transverse control arm 3 is pressed or stressed with respect to pressure. The body-side bearings 1a and 10, which have a characteristic corresponding to these stresses, yield in a targeted manner, whereby, as illustrated in FIG. 10, the wheel carrier 2 and therefore also the wheel are adjusted in the toe-in direction. At the same time, a moment formed of FBR X b is superimposed on this moment of $F_{BR}$ x LR resulting from the longitudinal springing, which is illustrated in FIG. 10 where it is assumed that the transverse control arm 3 and the tie rod 8 are disposed in a rigid manner. This moment causes at the same time a swivelling of the transverse control arm 3 and of the tie rod 8 against the driving direction F about the wheel steering pole P also in the toe-in direction.

Figure 8A:
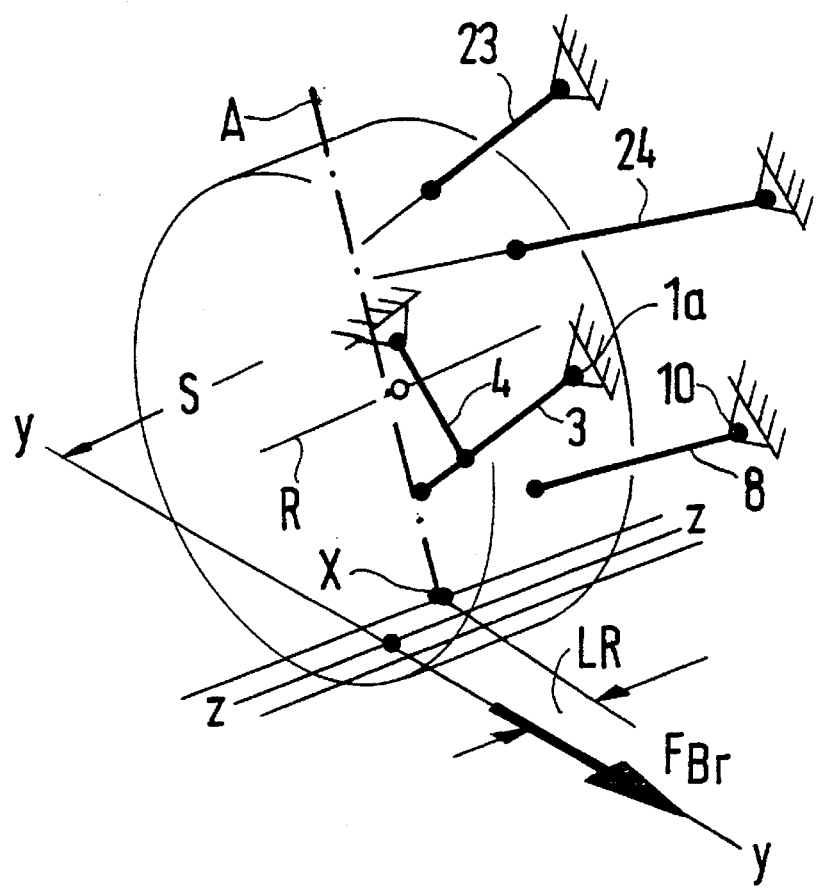

According to another embodiment according to FIG. 1a and the representations with respect to the braking forces $B_R$ according to FIGS. 8a and 9a, as a result of the position of the control axis A and therefore of the point of intersection X, a wheel position change is achieved in the toe-out direction. The control axis A meets the wheel contact surface with the point of intersection X on the interior side of the wheel center longitudinal plane Y—Y. The braking force FBR forms the lever arm LR with respect to this point of intersection X. The moment FBR X LR rotates the wheel into toe-out, in which case the tie rod 8 is stressed with respect to pressure D and the transverse control arm 3 is stressed with respect to tension Z. This toe-out is no disadvantage because the toe-in adjustment—caused by the longitudinal springing—will predominate and as a result a toe-in adjustment will be achieved. This toe-in adjustment as a result of the longitudinal springing is achieved by the moment FBR X b (see FIG. 10).

As a result of the braking force $F_{BR}$, the lower transverse control arm 3 and the tie rod 8 are pressed toward the rear—against the driving direction F—and the upper transverse control arms 23, 24 are pressed toward the front—in the driving direction F. This means that the wheel carrier rotates in the caster direction. In this case, the wheel-carrier-side bearing point of the tie rod moves upward; that is, away from the wheel contact surface. Depending on how, during the braking, the tie rod is disposed in a view from the rear—driving direction F—, the bearing point moves inward or outward, and the wheel is therefore adjusted into the toe-out or the toe-in position. Because of the short distance between the lower and the upper plane of the links, a caster angle change is relatively large.

Figure 11:
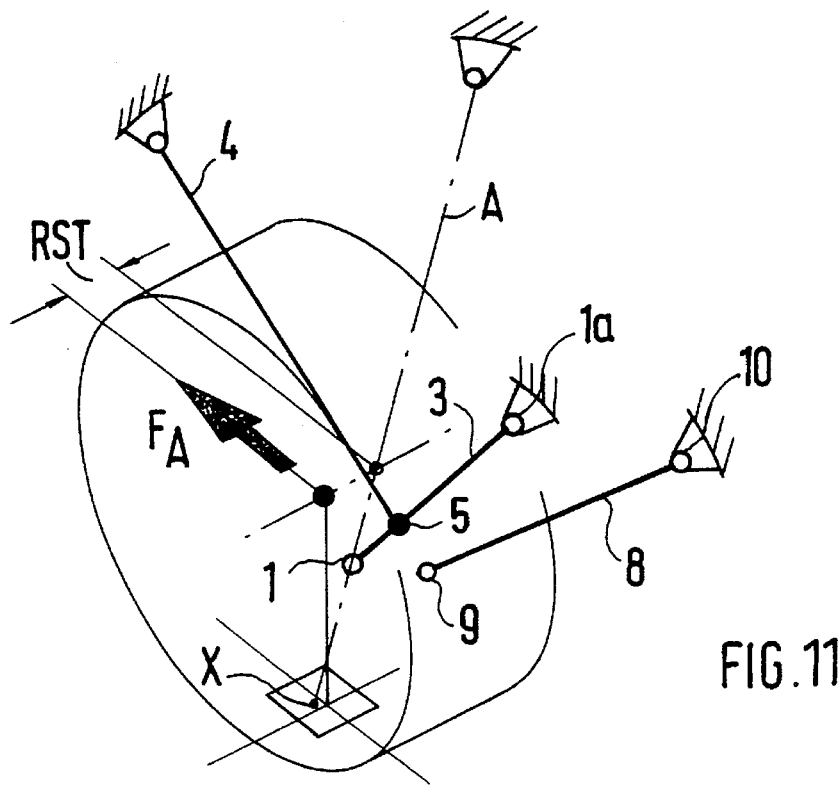
FIG. 11 is a diagrammatic representation of the rear wheel suspension with the disturbing-force lever arm according to FIG. 1.
Figure 12:
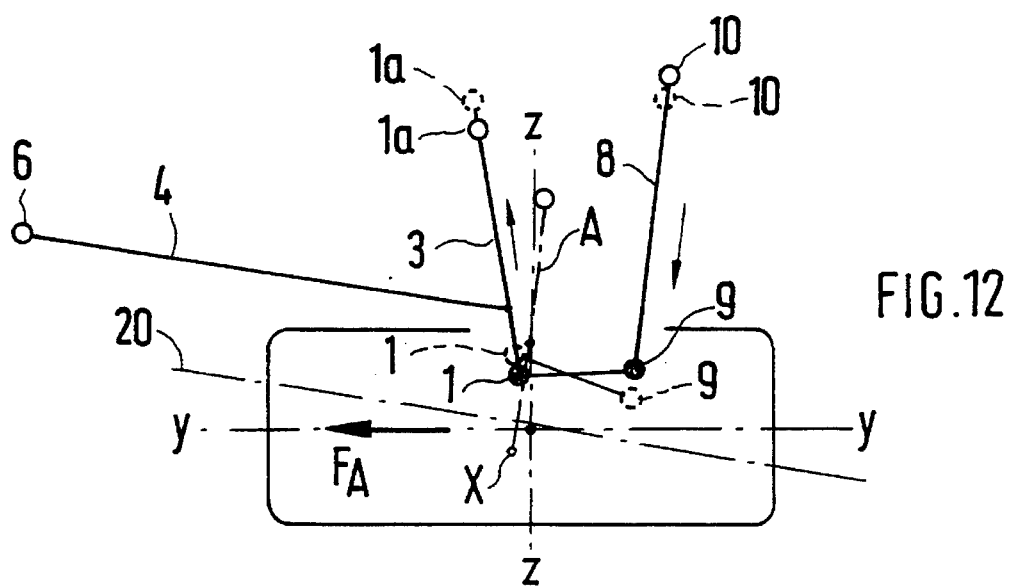
FIG. 12 is a top schematic view of FIG. 11 with a representation of the displacements of the transverse control arm and of the tie rod under the effect of the moment consisting of the driving force x the disturbing-force lever arm.
Figure 13:
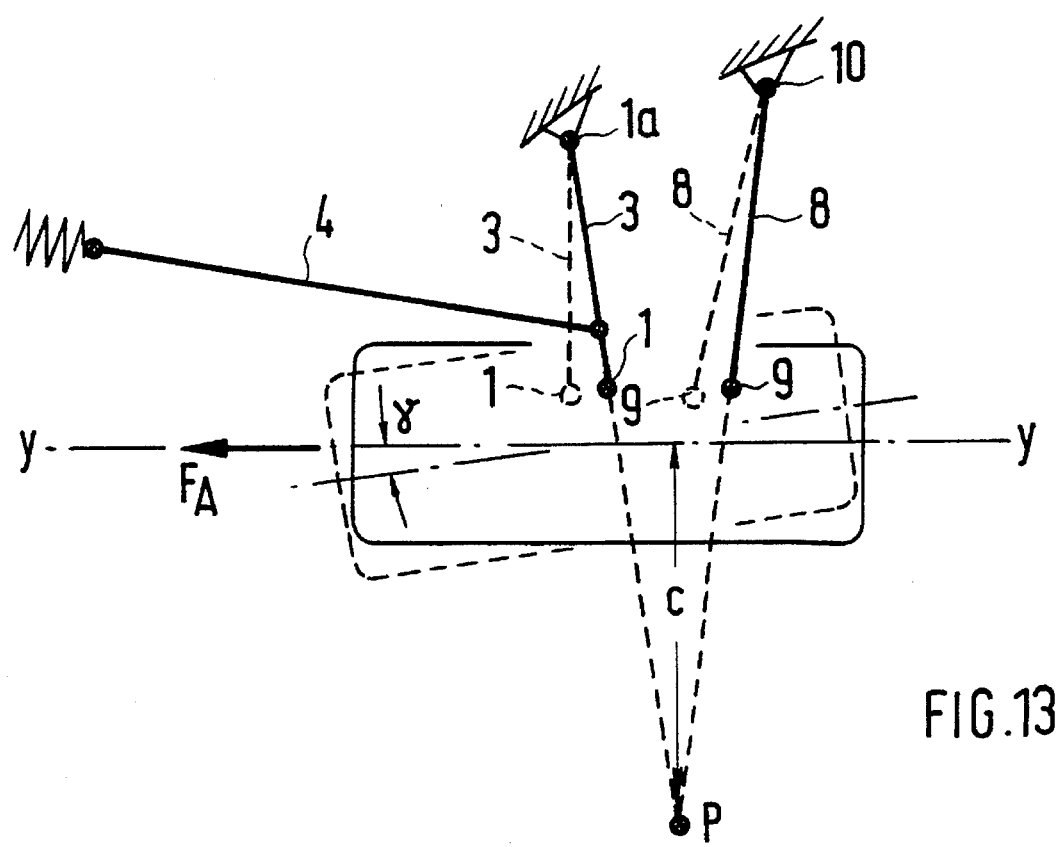
FIG. 13 is a representation according to FIG. 12 showing the wheel steering pole under the effect of the moment consisting of the driving force x the distance to the wheel steering pole.

As illustrated in detail in FIGS. 11 to 13 of the embodiment according to FIG. 1, the wheel is adjusted under the effect of driving forces $F_A$ and a resulting moment $F_A$ x RST in the toe-in direction, RST representing the distance from the control axis A to the perpendicular wheel center longitudinal plane y—y at the level of the wheel spin axis R. In the case of this adjustment, as a result of the elastic characteristic of the body-side bearings 1a and 10 of the transverse control arm 3 and of the tie rod 8, the tie rod 8 is pulled and the transverse control arm 3 is pressed, whereby the wheel carrier 2 would take up a position according to the dash-dotted lines 20 if no countermoment resulting from the longitudinal spring, as represented in FIG. 13 (wheel plane y—y at angle δ), formed by the driving force $F_A$ x c were to act upon the wheel, in which case c is the distance between the wheel steering pole P and the wheel center longitudinal plane y—y. When the tension strut in its elastic bearing 6 yields toward the front under the effect of the driving force, the driving force $F_A$ can swivel the wheel about the wheel steering pole P elastokinematically into the toe-out position and the "incorrect" toe-in change will be reversed by the moment $F_A$ X. RST. FIG. 13 shows the swivel movement of the transverse control arm 3 and of the tie rod 8 when the bearings 1a and 10 are assumed to be rigid, which shows that the transverse control arm 3 and the tie rod 8 can swivel toward the front in the driving direction F. This movement is superimposed on the movement of the transverse control arm and of the tie rod.

Figure 11A:
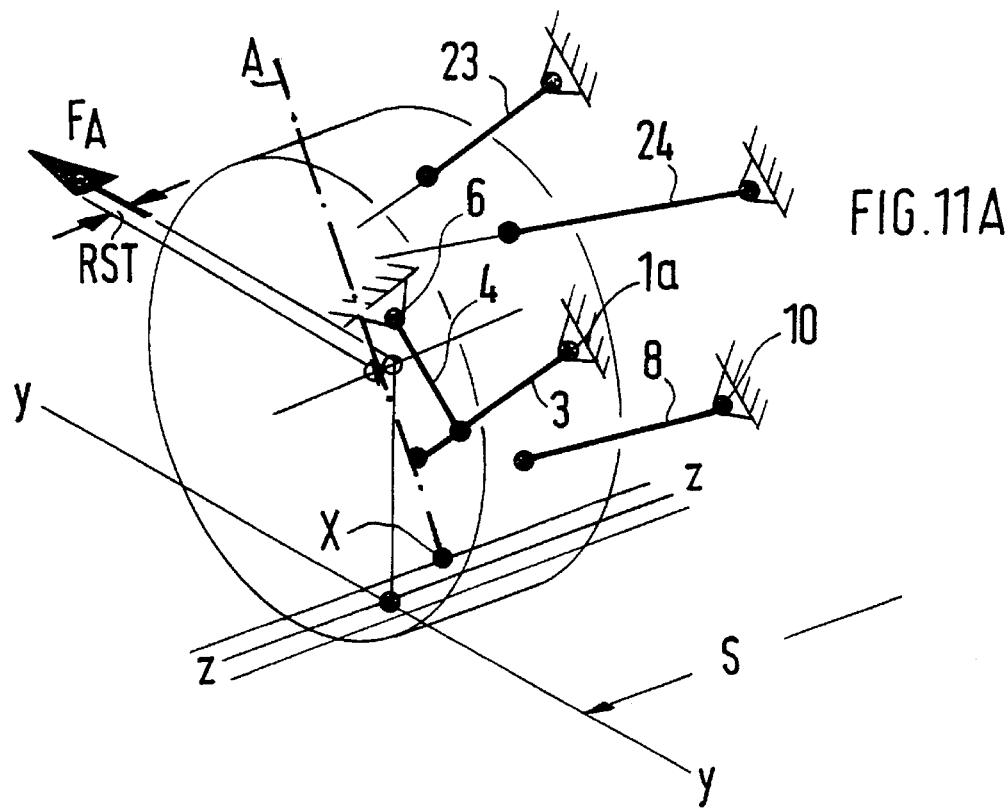
Figure 12A:
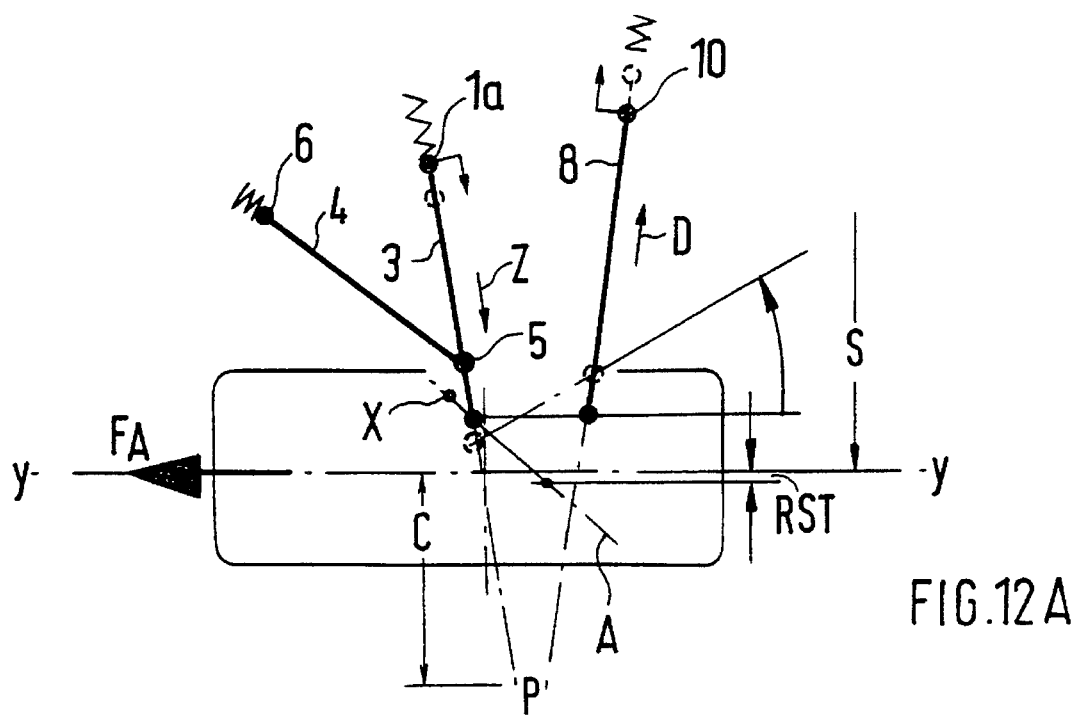
FIG. 12a is a top schematic view of FIG. 11a with a representation of the displacements of the transverse control arm and of the tie rod under the effect of the moment consisting of the driving force x the disturbing-force lever arm.

According to the embodiment of FIG. 1a and the representation with respect to the driving forces $F_A$ according to FIGS. 11a and 12a, the control axis A is disposed at the level of the wheel spin axis R within the perpendicular wheel center longitudinal plane Y—Y at the distance RST, also called negative disturbing-force lever arm. The moment $F_A$ x RST rotates the wheel slightly into the toe-out position, in which case the tie rod 8 is stressed with respect to pressure D and the transverse control arm 3 is stressed with respect to tension Z. As a result of a simultaneously occurring longitudinal springing (FIG. 13), this toe-out change is reinforced because the wheel steering pole P is situated outside the track width and a moment $F_A$ x C is built up.

During a cornering acceleration, an understeering is reinforced. When the wheel which is on the outside in the curve goes into the toe-out position, the understeering is slightly reduced again. In addition, as a result of this elastokinematic function, when the accelerator is released (load change) a turning-in is therefore counteracted in the toe-in direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:
1. Wheel suspension for a motor vehicle comprising:
a wheel carrier for carrying a wheel rotatable about a wheel spin axis and drivingly connected to a wheel drive shaft,
a steering gear tie rod connected to the wheel carrier,
a transverse control arm connected to the wheel carrier by a first joint connection and to a vehicle frame by a second joint connection,
a tension strut connected pivotably to the transverse control arm by a third joint connection and to the vehicle frame by a fourth joint connection, and
an upper wheel carrier support assembly connected to the wheel carrier and to the vehicle frame, said first joint connection and a pole of the connection of the upper wheel carrier support assembly to the vehicle frame defining a control axis,
wherein the transverse control arm with the connected tension strut is arranged below the wheel drive shaft and in front of the tie rod with respect to a forward driving direction of the vehicle,
wherein the tension strut extends forwardly, diagonally inwardly toward a vehicle center line,
wherein the transverse control arm and the tie rod have a positive positioning with respect to one another resulting in a wheel steering pole which is situated outside a vehicle wheel track width and behind a wheel center transverse plane, and
wherein the control axis intersects a wheel road surface contact plane at a position in front of the wheel center transverse plane.

2. Wheel suspension according to claim 1, wherein the upper wheel carrier support assembly includes a McPherson strut assembly which has an upper bearing connection at the vehicle frame, said control axis extending along a line connecting the first joint connection and the upper bearing connection of the McPherson strut assembly, and wherein the control axis intersects the wheel contact plane outside a wheel center longitudinal plane.

3. Wheel suspension according to claim 1, wherein the upper wheel carrier support assembly comprises two control arms disposed above the wheel drive shaft and separated from one another, said control arms being connected in respective bearings at the vehicle frame spaced a distance from one another, and further comprising a spring strut arranged between the control arms and supported on the wheel carrier.

4. Wheel suspension according to claim 3, wherein the control axis intersects the wheel contact plane within a wheel center longitudinal plane.

5. Wheel suspension according to claim 4, wherein the transverse control arm and the tension strut are connected by way of an elastic bearing at the third joint connection in an articulated manner, wherein the tension strut is supported by means of a bearing found at the fourth joint connection which is constructed on the vehicle frame in a soft manner in the direction of a tension strut axis and wherein the tie rod, the transverse control arm and the tension strut are held on the vehicle body in respective bearings in such an elastic fashion for achieving a toe-in adjustment during braking that by means of a moment formed from braking force times a lever arm, in which case the lever arm is disposed outside the track width and the wheel can be adjusted in the toe-out direction, the transverse control arm being stressable with respect to tension and the tie rod being stressable with respect to pressure, and, at the same time, this moment is superimposed by a moment resulting from the longitudinal springing formed from the braking force times a distance between the wheel center plane and the wheel steering pole.

6. Wheel suspension according to claim 5, wherein a bearing of the fourth joint connection of the tension strut has a characteristic which limits the toe-in adjustment as a whole.

7. Wheel suspension according to claim 4, wherein the control axis is arranged at the level of the wheel spin axis at a lever arm with respect to the direction of the effect of a driving force and body-side bearings of the transverse control arm and the tie rod have such an elasticity that, as a result of the moment of the driving force times said lever arm, the transverse control arm can be stressed with respect to tension and the tie rod can be stressed with respect to pressure, the lever arm being situated outside the track width and the wheel being adjusted in the toe-out direction and an additional toe-out adjustment by means of the moment of the driving force about the wheel steering pole being superimposed on this toe-out adjustment, so that, in the case of the driving force, on the whole, a wheel position change takes place in the toe-out direction and, in the case of a load change, a wheel position change takes place in the toe-in direction, the tension strut being supported on the vehicle frame in a bearing which has a soft construction in the direction of a tension strut axis.

8. Wheel suspension according to claim 1, wherein the transverse control arm has an elastic bearing on the vehicle frame, forming the second joint connection, disposed in front of the wheel spin axis with respect to the vehicle forward driving direction, and wherein the first joint connection is situated on the wheel carrier approximately in a perpendicular wheel center transverse plane.

9. Wheel suspension according to claim 8, wherein the tension strut, as viewed in a lateral view, extends at an angle with respect to a horizontal plane diagonally upward toward the front with respect to the vehicle forward driving direction, and wherein a bearing forming the fourth connection is situated on the vehicle frame below a horizontal plane extending through the wheel spin axis.

10. Wheel suspension according to claim 1, wherein the tension strut, as viewed in a lateral view, extends at an angle with respect to a horizontal plane diagonally upward toward the front with respect to the vehicle forward driving direction, and wherein a bearing forming the fourth joint connection is situated on the vehicle frame below a horizontal plane extending through the wheel spin axis.

11. Wheel suspension according to claim 1, wherein the tie rod on a vehicle body side has a harder elastic bearing than an elastic bearing of the second joint connection of the transverse control arm on the vehicle frame such that, in the case of a lateral force on the wheel on the outside of a curve by a moment consisting of the lateral force times the caster offset between the control axis and the operating direction of the lateral force, a moment of the lateral force times the distance between the direction of the effect of the lateral force and the wheel steering pole is superimposed and the tie rod is subjected to a lower pressure force than the transverse control arm and the wheel can be adjusted in the toe-in direction.

12. Wheel suspension according to claim 1, wherein the transverse control arm and the tie rod are disposed on the vehicle frame in bearings of approximately the same hard radial characteristic and, in the case of a lateral force, a moment occurs of the lateral force times the distance between the direction of the effect of the lateral force and the wheel steering pole, and wherein the wheel can be adjusted in the toe-in direction about the wheel steering pole, the tension strut being disposed on the vehicle frame in a bearing with a softer characteristic in the axial direction.

13. Wheel suspension according to claim 1, wherein the transverse control arm and the tension strut are connected by way of an elastic bearing at the third joint connection in an articulated manner, wherein the tension strut is supported by means of a bearing found at the fourth joint connection which is constructed on the vehicle frame in a soft manner in the direction of a tension strut axis, and wherein the tie rod, the transverse control arm and the tension strut are held on the vehicle frame in bearings in such an elastic fashion for achieving a toe-in adjustment during braking that by means of a moment formed from braking force times a lever arm, in which case the lever arm is disposed outside the track width and the wheel can be adjusted in the toe-in direction, the transverse control arm being stressable with respect to pressure and the tie rod being stressable with respect to tension, and, at the same time, this moment is supplemented by a moment resulting from the longitudinal springing formed from the braking force times a distance between the wheel center plane and the wheel steering pole.

14. Wheel suspension according to claim 1, wherein the control axis is arranged at a level of the wheel spin axis at a lever arm with respect to the direction of the effect of a driving force and body-side bearings of the transverse control arm and the tie rod have such an elasticity that, as a result of the moment of the driving force times the lever arm, the transverse control arm can be stressed with respect to pressure and the tie rod can be stressed with respect to tension, the lever arm being situated within the track width and the wheel being adjusted in the toe-in direction and a toe-out adjustment by means of the moment of the driving force about the wheel steering pole being superimposed on this toe-in adjustment so that in the case of the driving force, on the whole, a wheel position change takes place in the toe-out direction and, in the case of a load change, a wheel position change takes place in the toe-in direction, the tension strut being supported on the vehicle frame in a bearing of the fourth joint connection which has a soft construction in the direction of a tension strut axis.

* * * * *